Aug. 6, 1929. J. MAYER Re. 17,393

HAIR WAVING APPLIANCE AND METHOD

Original Filed March 19, 1925

INVENTOR

Josef Mayer

BY

Harvey R. Haugood

ATTORNEY

Reissued Aug. 6, 1929. Re. 17,393

UNITED STATES PATENT OFFICE.

JOSEF MAYER, OF KARLSBAD, CZECHOSLOVAKIA.

HAIR-WAVING APPLIANCE AND METHOD.

Original No. 1,622,957, dated March 29, 1927, Serial No. 16,784, filed March 19, 1925, and in Germany April 9, 1924. Divided and application filed September 14, 1926, Serial No. 135,439. Application for reissue filed March 11, 1929. Serial No. 346,174.

This invention relates to the waving of hair upon the human head, and more particularly to the production of lasting waves such as are known as "permanent" waves.

An object of this invention is to provide improved apparatus for permanent waving which will treat a flat spirally wound strand of hair.

Another object is to provide improved apparatus which will be easily manipulated and efficient in operation.

Another object is to provide an improved method of waving hair which will be effective in results and simple in performance.

Other objects will hereinafter appear.

The invention will be better understood from a description of apparatus constituting one practical embodiment of part of said invention and of the process performed by this apparatus constituting one practical embodiment of another part of said invention, the apparatus being illustrated in the accompanying drawings, in which Figure 1 is a fragmentary side elevation of a portion of a person's scalp with one strand of hair engaged by two clamps.

Figure 1:
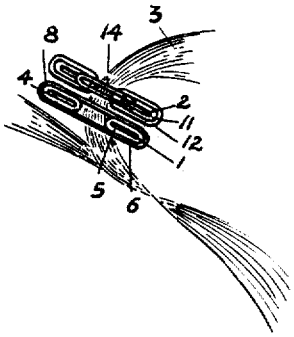

There are at present two styles of permanent hair curling or hair waving in use. In one a strand of hair is coiled from the root helically upon a curling rod, whilst in the other, the hair strands are wound from the free end, turn upon turn, upon a curler, the hair in the former case being bunched together to form a substantially round strand and in the latter case spread out more or less in the same plane to form a flat strand. After winding upon the curler the hair is in both cases subjected to the action of a suitable heating device to impart permanency to the curl in the case of the first process and to the wave in the second case.

The heating device for permanent curling generally consists of a sleeve like heating body, adapted to be passed over the curler when wound with hair and either left open or closed at its ends during the heating process. Such a sleeve like heating device can, however, not be used in the case of the waving of a flat hair strand inasmuch as the hair extending between the curler and the head along the length of the curler prevents its application to the curler.

Apparatus is provided as shown in the accompanying drawings in which 1, indicates an inner clamp and 2, an outer clamp. The strand of hair 3 is separated from the remaining hair and then the clamp 1 applied. This holds the strand 3 substantially at right angles to the scalp whereby it may receive further treatment as hereinafter fully described.

The clamp 1 consists of a pair of bars or plates 4 and 5 which may be fibre, metal or other comparatively stiff material. Each of these bars is covered with a covering of cloth 6 which may be a good grade of flannel. This covering is permanently arranged in place and may be, if desired, saturated with a treating solution. A rubber band 7 is preferably connected permanently to one end of the bars 4 and 5 so as to act as a hinge while a removable rubber band 8 is associated with the opposite end and acts to produce a final clamping action for holding the clamp 1 in place.

The clamp 1 holds the strand 3 properly for further treatment but in order to further screen the head from the heater in the final treatment, the second clamp 2 is used, which in addition to screening, acts to clamp the hair 3 tightly so that little or no vapor can pass along the hair to the scalp.

The clamp 2 consists of plates or bars 9 and 10 preferably of metal, each bar being shown as provided with a suitable covering. Preferably, a permanently positioned asbestos covering 11 is provided for each of the bars 9 and 10 and over this asbestos wrapping is arranged a wrapping 12 of cloth which is preferably a good grade of flannel. These wrappings are left on the plates 9 and 10, though if desired, they may be slit longitudinally therefrom at any time in order that the same may be repaired or new ones supplied. In treating the hair, the flannel 12 is preferably saturated with a treating solution.

It will be noted that bar 9 is provided with a notched or stepped end 13 for receiving a link 14 which is pivotally mounted on the bar 10. At the opposite end, a clevis bolt 15 is pivotally mounted on an extension 16 of bar 10 and projects through a suitable aperture in an extension 17 of bar 9. A spring 18 surrounds the shank from the bolt 15 and is put under the proper tension by nut 19 threaded onto the end bolt 15. This arrangement gives a resilient gripping action, and by arranging the link 14 on the desired step 13, the bars 9 and 10 may be kept parallel and maintain the strand 3 flat and under compression throughout its full width. Preferably, the tension on spring 18 is sufficient to cause the bars 9 and 10 to firmly grip the strand 3 and in a certain sense, seal the same against the passage of vapor toward the scalp.

The use of the clamp 2 is important in that it prevents the hot vapors from passing toward the head when the heater is in use.

After the parts have been arranged as described, the outer end of the strand 3 is placed beneath the tongue or gripping strip 20 pivotally mounted at 20′ on a curling rod or tube 21 which is of less diameter at the center than at the ends, and which tapers from the ends toward the center. After the strand of hair 3 has been clamped by tongue 20, the curler 21 is rotated until the hair is rolled on the curler to substantially the position shown in Figure 2. A wrapping 22 of flannel is then applied and with it a solution of any desired kind as for instance a mixture of water, bi-carbonate of soda and carbonate of magnesia, and over this wrapping a second wrapping 23 of waxed paper is applied, the waxed paper being longer than the curler 21 so that the ends may be twisted for completely enclosing the hair. The waxed paper with its various coverings acts to hold the vapor within the rolled hair and thereby act thereon so that the hair will be given a substantially permanent curvature or wave.

Figure 2:
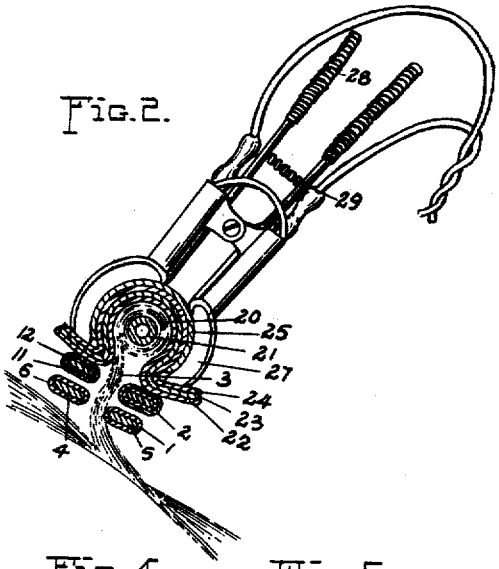
Figure 2 is a similar view showing the strands wound upon a curling rod and covered with covering material and an electric heater, parts being shown in cross section.
Figure 3:
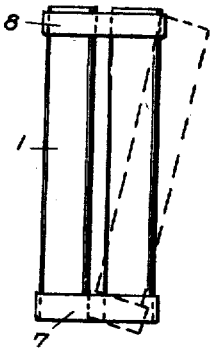
Figure 3 is a plan view of one of the clamps illustrated above.
Figure 4:
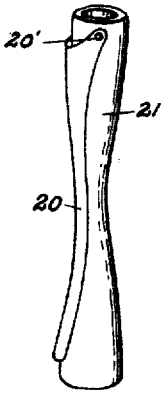
Figure 4 is a perspective view of the curler rod or tube.
Figure 5:
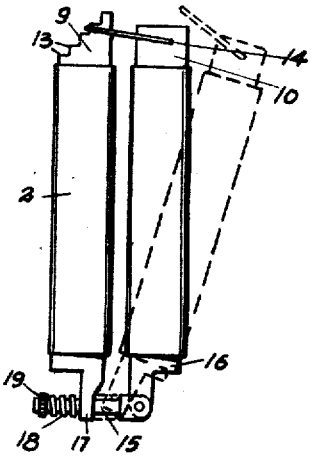
Figure 5 is a view similar to Figure 3 but showing the other clamp used.
Figure 6:
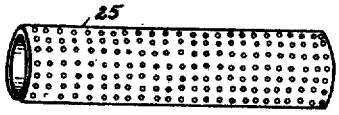
Figure 6 is a perspective view of a perforated metal holder.

In order to reenforce and protect the waxed paper, a covering 24 of parchment is applied over the paper and finally a metallic clamping member 25 is applied over the parchment as shown in Figure 2. The member 25 is perforated and is resilient so that it can be readily sprung into position and will somewhat grip the roll of hair.

A heater is next applied substantially in the position indicated in Figure 2. This heater is of the type shown in my patent No. 1,619,794 and extends for the full length of the curler rod. It consists of two arcuate shells 26 and 27 which contain electrical heating elements (not shown), the shells being provided with pivoted handles 28 urged apart by a spring 29 which causes the shells to grip the wrapped coil of hair. The electric current is then turned on and the hair subjected to heat and the moisture of the above mentioned solution to produce the permanent wave desired.

After the heat has been applied for the desired time the heater is removed and the various parts shown in Figure 2 are removed. The hair is preferably then combed out straight and finally allowed to fall into waves.

While I have described the above embodiment of my invention in some particularity, it is obvious that many other embodiments will readily occur to those skilled in this art and I do not therefore limit myself to the specific details described but claim as my invention all embodiments thereof falling within the scope of the appended claims.

I claim:

1. A process for producing permanent waves including winding flat strands of hair on tubular members, covering the wound hair with cloth impregnated with a hair treating solution, enclosing the cloth in wax paper, sealing the ends of the wax paper, covering the wax paper with a protecting covering of parchment, positioning a metallic flexible retainer over said parchment, and finally applying heat to said retainer, said heat being sufficient to penetrate said coverings and the wound hair.

2. The process of producing permanent waves comprising applying a clamp to a strand of hair for holding the same in position for treatment, applying a second clamp for preventing vapor from passing from the outer part of the hair to the roots, rolling the hair on a supporting member, covering the rolled hair with a substantially waterproof covering member, positioning a metallic flexible retainer over said covering member, and finally applying heat to said retainer, said heat being sufficient to penetrate said covering member and the hair while wound and covered.

3. A permanent hair waving apparatus comprising a pair of superimposed clamps for clamping a strand of hair near the base, means for winding the hair so that the axis of the wound hair will be substantially parallel with that part of the head from which the hair extends, waxed covering means for covering the wound hair, and a flexible metallic retainer arranged over said covering means, said holder being adapted to receive a heater for heating the hair while wound.

4. In a permanent hair waving apparatus a pair of flat bars for gripping a flat strand of hair, heat resisting means covering each of said bars, a liquid absorbing member covering said heat resisting means, a resilient hinge connecting said bars together adjacent one end, one of said bars being formed on the end opposite said hinge with a stepped formation, and an adjustable link carried by the other of said bars and adapted to fit against said stepped formation for connecting the opposite ends of said bars together.

5. A hair engaging clamp comprising two elongated heat insulated bars pivotally connected together at one end and detachably connected together at the other end.

6. A hair engaging clamp comprising two straight flat bars connected at one end by a pivot normal to their broad surfaces and latching means for detachably connecting the other ends of said bars.

7. A hair engaging clamp comprising two straight flat heat insulated bars connected together at one end by a pivot normal to their broad surfaces and a latch detachably and adjustably connecting the other ends of said bars.

8. The process of waving hair upon the human head which comprises dividing the hair into flat strands, gripping one strand adjacent the scalp of the wearer with a clamp, winding said strand spirally from its end to near said clamp upon a rod covering said strand with absorbent material containing hair treating solution next covering said strand and material with a moisture retaining envelope, and then applying heat to said strand.

9. The process of waving hair upon the human head which comprises dividing the hair against said stepped formation for connect- jacent the scalp of the wearer with a clamp, winding said strand from its end to near said clamp upon a rod, treating said strand with a solution and enclosing the strand in a substantially moisture tight envelope, covering said envelope with a sectional heater extending to said clamp, and then causing said heater to apply heat to said strand.

10. The process of waving hair upon the human head which comprises gripping a flat strand of hair adjacent to the scalp with a moisture tight clamp, winding said strand spirally from its end upon a rod nearly to said clamp, enclosing said strand together with moisture in a moisture retaining envelope, enclosing said strand and envelope within a heater extending about the same to the clamp, and then causing the heater to supply heat to the strand.

11. A clamp for retaining a flat strand of hair adjacent the scalp which comprises two elongated bars, means for clamping the bars together about the strand in substantially parallel arrangement, and insulation interposed between the bars and the scalp to prevent the transfer of heat therebetween.

In witness whereof, I have hereunto set my hand this 16 day of February, A. D., 1929.

JOSEF MAYER.

CERTIFICATE OF CORRECTION.

Reissue Patent No. 17,393. Granted August 6, 1929, to

JOSEF MAYER.

It is hereby certified that error appears in the printed specification of the above numbered patent requiring correction as follows: Page 3, claim 9, strike out line 3, and insert instead "into flat strands, surrounding one strand ad-"; and that the said Letters Patent should be read with this correction therein that the same may conform to the record of the case in the Patent Office.

Signed and sealed this 10th day of September, A. D. 1929.

(Seal)

M. J. Moore,
Acting Commissioner of Patents.